United States Patent [19]

O'Quin, II et al.

[11] Patent Number: 4,730,249

[45] Date of Patent: Mar. 8, 1988

[54] METHOD TO OPERATE ON LARGE SEGMENTS OF DATA IN A VIRTUAL MEMORY DATA PROCESSING SYSTEM

[75] Inventors: John T. O'Quin, II, Austin, Tex.; John C. O'Quin, III, Chappaqua, N.Y.

[73] Assignee: International Business Machines Corporation, Armonk, N.Y.

[21] Appl. No.: 819,457

[22] Filed: Jan. 16, 1986

[51] Int. Cl.⁴ .................. G06F 15/00; G06F 12/08
[52] U.S. Cl. .................. 364/200; 364/300
[58] Field of Search .............. 364/300, 200 MS File, 364/900 MS File

[56] References Cited

U.S. PATENT DOCUMENTS

| | | | |
|---|---|---|---|
| 4,173,781 | 11/1979 | Cencier | 364/200 |
| 4,173,783 | 11/1979 | Couleur et al. | 364/200 |
| 4,374,417 | 2/1983 | Bradley et al. | 364/200 |
| 4,442,487 | 4/1984 | Fletcher et al. | 364/200 |
| 4,525,778 | 6/1985 | Cane | 364/200 |
| 4,532,590 | 7/1985 | Wallach et al. | 364/200 |
| 4,569,018 | 2/1986 | Hummel et al. | 364/200 |
| 4,654,777 | 3/1987 | Nakamura | 364/200 |

Primary Examiner—Archie E. Williams, Jr.
Assistant Examiner—Thomas C. Lee
Attorney, Agent, or Firm—Richard E. Cummins

[57] ABSTRACT

A method for use in a virtual memory data processing system employing a pageable External Page Table data structure for recording current status and disk address information for each virtual page in said system, provides improved system performance when a large number of virtual pages are to be operated on in the same manner. In accordance with the method, each page of External Page Table entries can record a predetermined number of entries (512), depending on the byte capacity of each virtual page (2,048) and the size of each entry (4 bytes). One page of 512 entries correspond to 1 megabyte of virtual storage (512×2,048) and also appears as one entry in a pinned External Page Table. The pinned External Page Table is referred to as the "XPT of the XPT," and has the same format as the pageable XPT. A 256 megabyte segment of virtual memory is representable in the XPT of the XPT by 256, 4 byte entries, or one-half of a page.

Where all virtual pages represented by a page of XPT entries are to be processed in the same way (i.e., created, destroyed), one operation on one entry in the XPT of the XPT is made, rather than 512 operations on the 512 entries of the XPT.

10 Claims, 8 Drawing Figures

METHOD TO OPERATE ON LARGE SEGMENTS OF DATA IN A VIRTUAL MEMORY DATA PROCESSING SYSTEM

FIELD OF INVENTION

This invention relates in general to methods for controlling the allocation and management of the virtual address space of a virtual memory in a data processing system, and in particular, to an improved method of operating on relatively large segments of data stored in the virtual memory.

BACKGROUND ART

The prior art discloses various arrangements of data processing systems employing a virtual memory approach for storing information which is used and/or processed by the system. Virtual memory arrangements currently employed in the art generally involve a relatively small capacity semiconductor memory which is fast, and a relatively large capacity storage device, such as a disk drive which is relatively inexpensive storage, but relatively slow. The small capacity memory is made to appear quite large to the system by means of a paging mechanism which functions to transfer data between the two separate storage entities so that the information required by the system is always available in real memory. The transfer of data is referred to as "paging," in that the data is transferred in blocks or "pages," each of which is generally a fixed size, such as 2048 (2k) bytes. The mechanism for controlling the paging operation is usually referred to as the paging mechanism or paging subsystem.

The paging mechanism causes a page of data to be paged into real memory in response to the occurrence of a page fault. A page fault occurs when the system requests data that is not in real memory. The page fault mechanism which functionally is usually part of the overall memory management unit determines that the requested data is not in real memory, and initiates the paging operation. A page fault causes the program that is being executed, often referred to as a "process," to be halted until the page fault is resolved by paging in the required data. In a single user/single application environment, page faults have a direct impact on the overall system performance. If, however, the system is capable of running more than one process concurrently, the adverse effect of a page fault is decreased, since another process can be dispatched by the system while the one interrupted process is waiting for its page fault to be resolved.

One aspect in the design of a virtual memory systems involves the manner in which addressing is handled. The "real memory" which interfaces directly with the system is generally addressable at a byte level. As a result, the number of byte storage locations or addresses is, therefore, equivalent to the storage capacity of the real memory, and determines the number of bits required in the address. For example, a 64k memory requires a 16 bit address, in that 2*(16) [2 to the exponent 16]=64K (65,536) whereas a 1 megabyte memory requires a 20 bit address to address each of its locations 2*(20)=1 megabyte of memory or 1 million addresses).

The virtual memory address space is generally much, much larger than the real memory address space.

One technique used by many virtual memory systems to generate a virtual address is referred to as "paged segmentation." Assume for example that the address space has 2*(40) separate address locations. In the paged segmentation technique, the effective address space of the virtual memory is divided into, for example, 16 separate equal-sized memory segments by the memory management unit. Each segment is represented or addressed by a 12 bit memory segment identifier which is contained in one of 16 segment registers. Four bits of the 32 bit effective address from the processor are used to select one of the 16 segment registers to provide the 12 bit memory segment identifier, which is concatenated with the remaining 28 bits (32−4) of the effective address which is used as the segment offset. Under the above assumptions the byte capacity of the virtual memory is 2*(40).

In order to assign and manage addressing operations, many systems provide three primary data structures associated with the memory management unit. They are the Segment Table (ST), the External Page Table (XPT) and the Inverted Page Table (IPT).

The Segment Table defines the objects that can be referenced by the system, an object being, for example, a complete program, a mapped file, or computational data. The Segment Table contains information such as the segment size and the start of the segment's External Page Table. The Segment Table contains one entry for each object defined in memory. The ST is stored in real memory and is not pageable.

An External Page Table (XPT) is provided for each segment. One entry in the table comprises four bytes and describes characteristics of the associated page, such as its location on the disk and protection-type information for that page. If the segment contains 100 pages, its XPT will contain 100 entries and will be 400 bytes in size. The XPT is pageable by the system.

The External Page Tables, per se, are stored at virtual addresses which are part of the segment that contains the program for managing system resources, generally referred to as the Virtual Resource Manager (VRM). The VRM segment in memory includes a pool of External Page Tables, and since each segment in the system requires an XPT, the XPT for the VRM segment is also stored in this pool. Since the XPT for the VRM segment contains a separate four byte entry for each page of the VRM segment, a subset of the four byte entries for each VRM segment's External Page Table defines the External Page Tables for the other segments. This section, or subset, of the XPT for the VRM segment is referred to as the "XPT of the XPT," and is not pageable.

The third important data structure employed is the Inverted Page Table (IPT). Real memory is divided into page frames, corresponding in size to pages in the virtual address space, i.e., 2k. A page frame in real memory is, therefore, a container for one virtual page. The function of the IPT is, therefore, merely to identify the virtual page that is currently in each page frame of real memory. Each entry in the IPT is 32 bytes long. The IPT is not pageable.

The memory manager uses the IPT information in translating a virtual address into a real address and signals a page fault when a requested virtual page is not contained in the IPT.

As the speed and computing power of processing units increases, and the cost for a byte of storage and access time decreases, there is a desire and trend to provide larger virtual memories to handle larger and more complex applications. This results in the various objects that are stored in virtual memory, requiring larger and larger segments, i.e., more pages. It is assumed that in this discussion, a large segment contains at least one megabyte of storage space. Depending on the object, the segment may be completely filled with data, or sparsely filled. For reference purposes, a sparse segment is defined as one which contains at least one unreferenced region that is large enough to contain a storage area that can be defined by at least one page of XPT entries. At 4 bytes per entry, 1 page of xpt entries covers 512 virtual pages or a 1 megabyte address space.

There are several virtual memory operations that perform an operation on an entire segment, such as create segment, copy segment, change segment size, and destroy segment. Services of this type should support large segments without a significant system performance penalty. This goal is difficult to achieve, because the size of a segment's XPT is proportional to the size of the segment and, therefore, a large segment has a large XPT. For example, a 256 megabyte segment has 131,072 XPT entries. This requires 256 pages in the pool of XPT entries that is part of the VRM segment. An XPT entry defines 2,048 bytes of virtual memory. A page of XPT entries contains 512 XPT entries, and defines one megabyte of virtual memory. Therefore, 256 pages of XPT entries are required to define a 256 megabyte segment.

The prior art virtual memory systems do not provide a solution to the adverse impact on the system that is experienced when the system must operate on a very large number of pages, e.g. more than 512 pages. Accessing this large an amount of data can result in significant overhead, due to the number of instructions executed, the number of pages referenced, and the number of page faults resulting from these references.

The present invention describes a method to overcome the shortcomings of the prior art in operating on large data segments in a virtual memory environment.

SUMMARY OF THE INVENTION

In accordance with the present invention, a method for processing large segments of data takes advantage of the existence in the VRM segment of the External Page Table that references the XPTs of the large segment, i.e., the "XPT of the XPT." The method permits operation on 512 virtual pages, merely by operating on one entry in the XPT of the XPT, assuming, of course, that all 512 virtual pages are to be subjected to the same operation.

It is therefore an object of the present invention to provide an improved method for processing large data segments in a virtual memory type data processing system.

Another object of the present invention is to provide an improved method for processing large data segments by a data processing system in which a paged segmentation technique is employed by the virtual memory.

A further object of the present invention is to provide an improved method for handling large data segments in a virtual memory data processing system whenever at least one of the external page tables for the large data segment contains entries associated with pages that are to be processed in an identical manner.

Objects and advantages other than those mentioned above will become apparent from the following description when read in connection with the drawing.

DESCRIPTION OF THE PREFERRED EMBODIMENT

Figure 1:
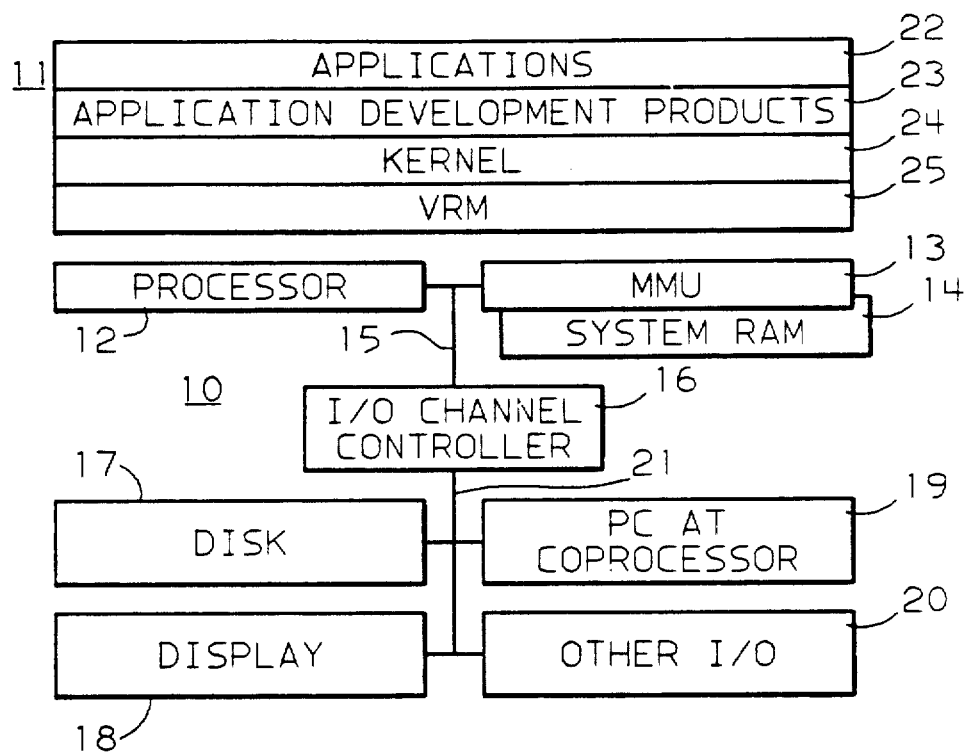
FIG. 1 is a schematic illustration of a virtual memory system in which the method of the present invention may be advantageously employed.

System Overview: FIG. 1 is a schematic illustration of a virtual memory system in which the method of the present invention is employed. As shown in FIG. 1, the system comprises a hardware section 10 and a software or programming section 11. Hardware section 10, as shown, comprises a processor function 12, a memory management function 13, a system memory function or RAM 14, a system bus 15, an Input/Output Channel Controller (IOCC) 16, and an Input/Output bus 21. The hardware section further includes a group of I/O devices attached to the I/O bus 21 through the IOCC 16, including a disk storage function 17, a display function 18, a co-processor function 19, and block 20, representing other I/O devices such as a keyboard or mouse-type device.

The program section of the system includes the application program 22 that is to be run on the system, a group of application development programs 23, or tools to assist in developing new applications, an operating system kernel 24, which, for example, may be an extension of the UNIX* System V kernel, and a Virtual Resource Manager program 25, which functions to permit a number of virtual machines to be created, each of which is running a different operating system, but sharing the system resources. The system may operate, therefore, in a multi-tasking, multi-user environment which is one of the main reasons for requiring a large virtual memory type storage system.

*Unix is a trademark of A.T.&T.

Figure 2:
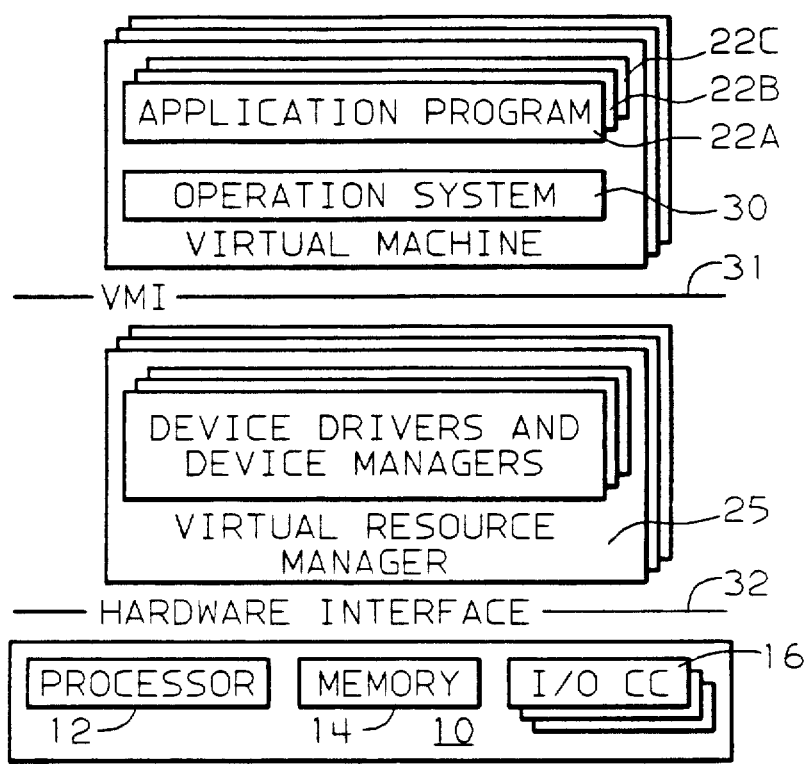
FIG. 2 illustrates the interrelationship of the Virtual Resource Manager shown in FIG. 1 to the data processing system and a virtual machine.

FIG. 2 illustrates the relationship of the Virtual Resource Manager 25 to the other components of the system. As shown in FIG. 2, a virtual machine includes one or more application programs such as 22a-22c and at least one operating system 30. A virtual machine interface 31 is established between the virtual machine and the VRM 25. A hardware interface 32 is also established between the VRM 25 and the hardware section 10. The VRM 25 supports virtual memory. It can be assumed, for purposes of explanation, that the memory capabilities of the hardware shown in FIG. 1 includes a 24 bit address space for system memory 14, which equates to a capacity of 16 megabytes for memory 14, and a 40 bit address space for virtual memory, which equates to 1 terabyte of memory. A paged segmentation technique is implemented for the Memory Management Unit 13, so that the total virtual address space is divided into 4,096 memory segments, with each memory segment occupying 256 megabytes.

Figure 3:
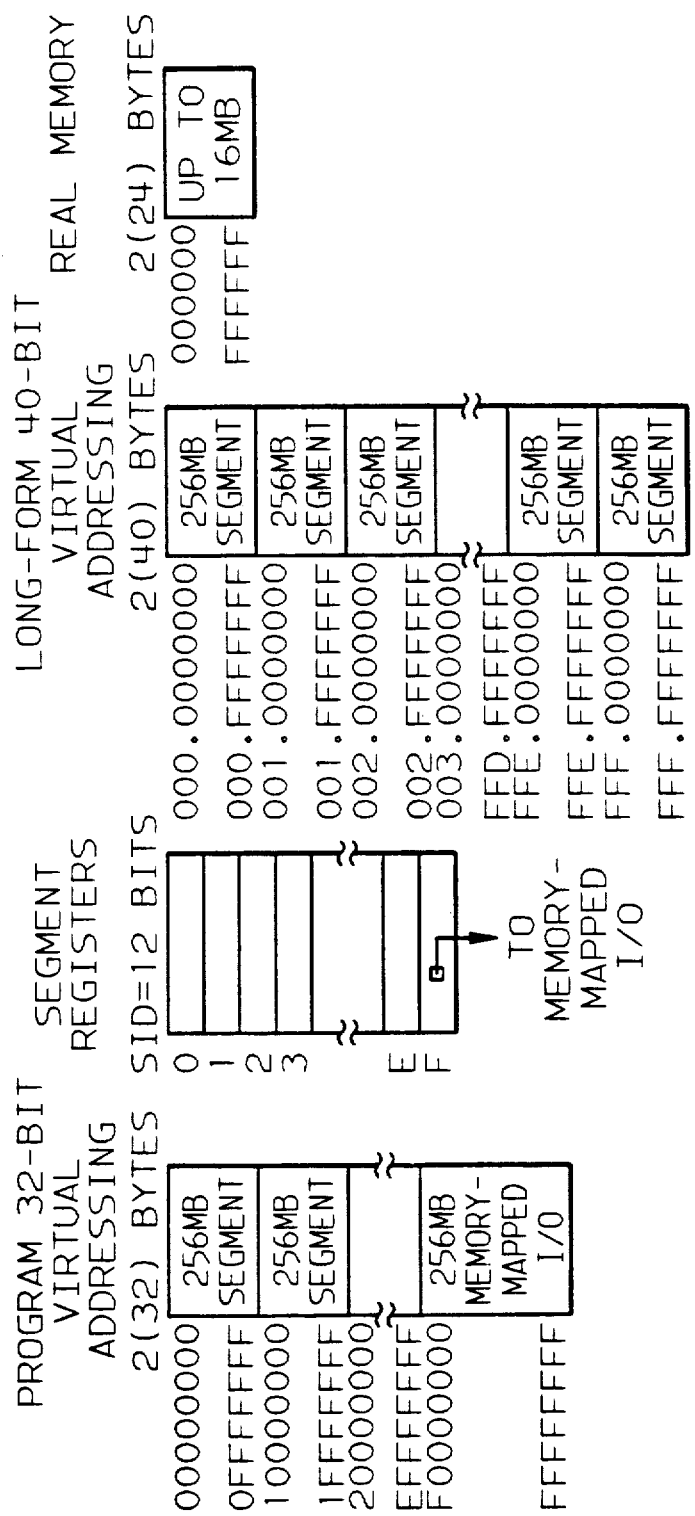
FIG. 3 illustrates the virtual storage model for the system shown in FIG. 1.

FIG. 3 illustrates the virtual storage model. The processor 12 provides a 32 bit effective address which is specified, for example, by the application program. The high order 4 bits of the 32 bit address functions to select 1 of 16 segment registers which are located in the Memory Management Unit (MMU) 13. Each segment register contains a 12 bit segment ID section, along with other special control-type bits. The 12 bit segment ID is concatenated with the remaining 28 bits of the initial effective address to provide the 40 bit virtual address for the system. The 40 bit virtual address is subsequently translated to a 24 bit real address, which is used to address the system memory 14.

The MMU 13 utilizes a Translation Look-aside Buffer (TLB) to contain translations of the most recently used virtual addresses. Hardware is used to automatically update TLB entries from main storage page tables as new virtual addresses are presented to the TLBs for translation.

Figure 4:
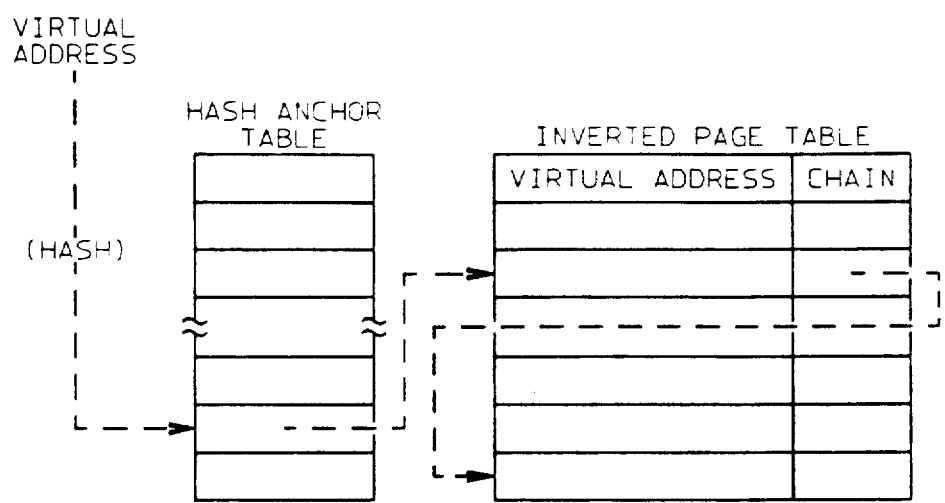
FIG. 4 illustrates conceptually, the TLB reload function of the system shown in FIG. 1.
Figure 5:
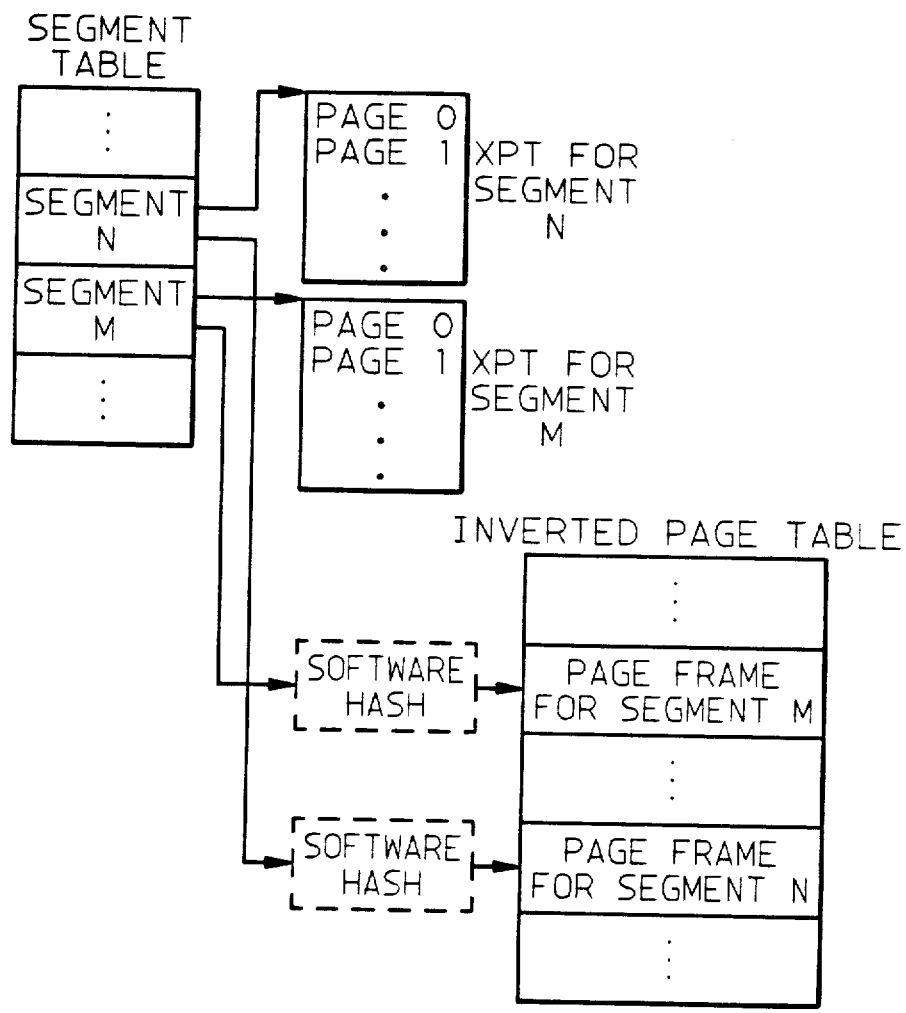
FIG. 5 illustrates some of the data structures that are employed in the system shown in FIG. 1.

FIG. 4 illustrates conceptually, the TLB reload function. The 40 bit virtual addresses are loaded into the TLB by looking them up in an Inverted Page Table (IPT), as shown in FIG. 4. The table is "inverted" because it contains one entry for each real memory page, rather than one per virtual page. Thus, a fixed portion of real memory is required for the IPT, regardless of the number of processes or virtual segments supported. To translate an address, a hashing function is applied to the virtual page number (high order part of the 40 bit virtual address, less the page offset) to obtain an index to the Hash Anchor Table (HAT). Each HAT entry points to a chain of IPT entries with the same hash value. A linear search of the hash chain yields the IPT entry and, thus, the real page number which corresponds to the original 40 bit virtual address. If no such entry is found, then the virtual page has not been mapped into the system, and a page fault interrupt is taken.

The function of the Page Fault Handler (PFH) is to assign real memory to the referenced virtual page and to perform the necessary I/O to transfer the requested data into the real memory. The system is, thus, a demand paging type system.

When real memory becomes full, the PFH is also responsible for selecting which page of data is paged out. The selection is done by a suitable algorithm such as a clock page replacement algorithm, where pages are replaced based on when the page was last used or referenced. Pages are transferred out to disk storage.

VIRTUAL MEMORY MANAGER DATA STRUCTURES

The characteristics of the Virtual Memory Manager data structures will now be described.

Segment Table: The Segment Table (ST) contains information describing the active segments. The table has the following characteristics. The table is pinned in real memory and its size is predetermined. It must be word-aligned in memory, and if the segment table is to be altered, the process that performs the change operation must not be interrupted during that time. The latter function is referred to as a critical section of the program, in that accesses to the segment table must be serialized.

External Page Table: The External Page Table (XPT) describes how a page is mapped to the disk. There is one XPT entry for each defined page of virtual memory. The XPT entries for a segment are allocated as continuous entries when the segment is created. The XPT entries for a small segment, that is one that is less than 1 megabyte, do not cross an XPT page boundary. The XPTs for a large segment, those larger than 1 megabyte, are aligned at the start of an XPT page. The XPT entries are allocated in units of 32 entries which will map 65,536 bytes (64K) of virtual memory. Each entry requires 4 bytes. The table has the following characteristics. Only XPT root entries must be pinned into memory. Its size is predetermined, and it must be word-aligned. The virtual page number is the index into the XPT table. The XPT must be altered only in a Virtual Memory Manager critical section.

Inverted Page Table: The Inverted Page Table (IPT) describes the relationship between virtual addresses and real addresses, as discussed previously. The IPT consists of two arrays. The first one is primarily defined by the memory management unit, and contains the information that controls the translation function. The second array contains the Virtual Memory Manager page state information, used to control page fault processing. This array has the following characteristics. It is pinned, and its size is determined by the real memory size which is set at the Initial Program Load time (IPL). It is aligned according to real memory size. The real page number is the index into the IPT. Like the previous structures, it must be altered in a virtual memory critical section. Each real page frame has an entry in the IPT. All pages are on one of three lists.

There is one main list for each valid segment. It is doubly linked and anchored in the segment control block. This list links together all of the page frames assigned to the segment with a valid virtual address, and for which there may be a valid Translation Lookaside Buffer (TLB) entry.

There is one system-wide free list that links together the page frames that may be reassigned. This doubly linked, circular list is anchored in the IPT entry for page one. Pages on this list do not have a valid TLB entry, and accesses to them will always result in a page fault. Pages may be on both the main list and free list. This is done so that the pages may be released without searching the free list. Unnamed (unhashed) pages are put at the head of the list, and named (hashed) pages are put at the tail.

There is one system-wide I/O list that links together all of the pages currently being read or written to the disk. This doubly linked, circular list is anchored in the IPT entry for page two. Pages on this list do not have a valid TLB entry, and accesses to them will also result in a page fault. There must be only one page I/O list to ensure that I/O is processed first-in, first-out by block, even if non-first-in, first-out disk scheduling is performed.

Notification Control Block: A Notification Control Block (NCB) contains the information required to notify a virtual machine of the completion of an asynchronous paging request. The asynchronous request can be either a purged page range Service Call (SVC), or a page fault when asynchronous acknowledgement is allowed. An NCB is a self-describing control block in the system control block area. Its identifier field can be used to differentiate it from other types of control blocks in the system control block area. This is required since NCBs are queued on the same list as Process Block Headers (PBHs). An NCB is pinned and allocated in the system control block area when needed. Like the previous structures, it must be altered in a Virtual Memory Manager critical section. An NCB is only allocated when the Virtual Memory Manager is performing a function on behalf of a process and, therefore, will not cause the system to abnormally terminate due to insufficient system control blocks.

Page Fault Wait Lists: The Virtual Memory Manager can place a process either internal or virtual machine on one of three circular wait lists.

There is one page I/O wait list for each frame in the system. A page's I/O wait list is anchored in the page's IPT entry and links together the Process Block Headers (PBHs) of the processes synchronously waiting for I/O to complete to the page, and the NCBs of the processes asynchronously waiting for I/O completion notification. A process is placed in a page's I/O wait list when it reclaims the page with I/O in progress or it initiates a page in I/O as a result of a page fault.

There is one global system free page frame wait list. It links together the PBHs or NCBs for the processes that are waiting for a free page frame. This list is processed first-in, first-out. A process is placed on this list when it requires a free page frame and there is not one available. The processes' PBH is enqueued on the list for synchronous waits and an NCB is enqueued on the list for asynchronous waits.

Lastly, there is one global system page I/O wait list. It links together the PBHs or NCBs for the processes that are waiting for all page out I/O less than or equal to a specific page I/O level. This list is sorted by a page I/O level. A process is placed on this list by several of the Virtual Memory Manager service calls to ensure that the contents of the disk match the contents in memory. A PBH is enqueued on the list for synchronous requests or an NCB is enqueued on the list for asynchronous requests. Note that with non-first-in, first-out disk scheduling, the page I/O level may result in the process waiting longer than is required.

Paging Mini-Disk Table: The paging mini-disk table controls the translation of Virtual Memory Manager slot numbers into the mini-disk I/O Device Number (IODN) and logical block number. The number of entries in this table define the maximum number of mini-disks that the Virtual Memory Manager can perform paging operations to. This array has the following characteristics. It is pinned, its size is predetermined, and it is word-aligned. The paging space mini-disk entries are allocated at system initialization and must be the first entry/entries in the table. Mapped page range service calls allocate an entry for mapped mini-disks. The most significant bits of the disk address are the index into this table. As in the previous data structures, it must only be altered in a Virtual Memory Manager critical section.

Disk Allocation Bit Map: The Virtual Memory Manager maintains a bit map for each paging space mini-disk. Each bit indicates if its page is allocated or free. Bad slots are marked as allocated when the mini-disk is opened at system initialization. This array has the following characteristics. It is not pageable, the paging space is allocated at page out time, the least significant bits of the disk address are the index into this array, and as with the previous structures, it must be altered only in a Virtual Memory Manager critical section.

Paging Device Extensions: One Paging Device Extension (PDX) exists for each paging space that the Virtual Memory Manager supports. A PDX is an extension for a paging space entry in the paging mini-disk table. The Virtual Memory Manager manages paging space and the PDX is what is used to guide it in that management. The attributes of the PDX are; it is pinned and it is allocated from the system control block area at system initialization. It is linked together in a list and anchored by a global pointer, and as previous structures, it must be altered only in a Virtual Memory Manager critical section. PDXs are not dynamically allocated. System initialization allocates all PDXs and initializes them.

Page Fault Processing: Synchronous page fault processing is the traditional type of page fault processing. In this operation, the faulting process is forced to wait until the I/O required to resolve the page fault is complete. The Virtual Memory Manager restarts the process at the completion of each I/O request. When redispatched, the process will either page fault, in which case additional I/O will be scheduled to resolve the fault, or will not page fault, in which case the page fault was resolved. There are two major advantages to this type of page fault processing. First, the Virtual Memory Manager does not need to maintain a page fault state data structure to tell it how to restart the page fault processing for the page. Secondly, this type of a design is more compatible with the dynamic nature of a demand paging systems.

The VMM which executes within the VRM has no concept of the tasks, structure, or environment of tasks executing within a virtual machine. Therefore, the Virtual Memory Manager cannot effectively manage these tasks through traditional synchronous page fault processing. The concept of asynchronous page fault processing with notification is used to overcome this limitation. In general, a virtual machine is informed of page faults through a "page fault occurred" machine communication interrupt. Subsequently, the virtual machine receives a "page fault cleared" machine communication interrupt so that it can put its faulting task back on its ready task list. This allows page faults to be processed asynchronously with respect to the execution on the virtual machine. The virtual machine can force synchronous page fault processing by disabling page fault notifications. It should be noted that page fault cleared interrupts cannot be directly disabled by a virtual machine. A page fault cleared interrupt is always given when the I/O is complete for a fault that has resulted in a page fault occurred interrupt. Page fault cleared interrupts can be indirectly disabled by disabling page fault occurred interrupts.

Synchronous Page Fault Processing: For synchronous faults, the Process Block Header (PBH) of the process that faulted is placed on either the page's I/O wait list or the free page frame list when the I/O is required. The process is placed on the page I/O wait list when the Virtual Memory Manager initiates I/O for the page or I/O for the page was already in progress. The process is placed on the free page frame list when there are no free page frames available to perform the I/O into.

Asynchronous Page Fault Processing: When an asynchronous page fault occurs, the faulting virtual machine is notified of the segment identifier it faulted on, and the virtual address rounded down to the nearest page boundary. It is important to note that notification is not given for the address that the virtual machine faulted on, but for that page. For example, if a virtual machine faults on addresses x'806', x'856', x'87E', it will get three page fault occurred notifications for x'800' and one page fault cleared notification for x'800'. A Notify Control Block (NCB) is allocated and chained to the page's I/O wait list when I/O is required. This is the same chain that PBHs are chained onto. The PBHs and NCBs are typed so it is possible to tell them apart. A PBH is chained for a synchronous fault and an NCB is chained for an asynchronous fault.

If the notification was given because of a page fault on the External Page Table I/O (I/O other than the original fault), then the Notification Control Block is chained off the IPT that the XPT is paged into, but the address of the original fault is in the Notification Control Block.

The free frame wait list case is a special case. The virtual machine is notified and its Notification Control Block is chained, first-in, first-out, onto the free frame wait list along with PBHs. The first page out that causes a frame to be freed-up when this NCB is at the head of the free frame wait list will cause notification to be given.

Page Fault Occurred Notification: A page fault occurred interrupt is generated by the page fault handler upon determining that an asynchronous fault has occurred and I/O is required. No internal VRM queue element is required to perform this function. The page fault handler actually swaps the virtual machine's (PSB) and execution level. The premise that allows this is that page faults on machine communications or program check levels are processed synchronously, without notification. This implies that the interrupt does not need to be queued because the virtual machine can always take page fault occurred interrupts.

Page Fault Cleared Notification: When the I/O for a page fault is complete, the Virtual Memory Manager will be called to clean up.

The page fault complete interrupt is queued to the virtual machine by the VRM queue management function. This implies the need for a queue element. The Notification Control Block is used for that function.

Asynchronous Page Fault Scenario: A page fault is considered complete when each I/O it generates completes. A virtual machine will get 'n' total page fault occurred interrupts, and 'n' page fault complete interrupts for a page fault that requires 'n' I/Os to satisfy. Example (n=3 here): Assume that the virtual machine faults asynchronously on a page that exists, but is not in memory, there are no free frames in memory to page it into, and the virtual memory manager faults on the XPT for the original page. The following lists the order of events (Note that this scenario is not the typical case):

1. VM Page Faults
2. VMM Enqueues Page out requests to build up free page frame list.
3. VMM Notifies virtual machine of Original Page Fault
4. VM is Dispatched (presumably it will task switch or wait)
5. Page out I/O completes
6. VMM Notifies virtual machine that the original Page Fault is resolved
7. VM is Dispatched
8. VM Page Faults again on the same address
9. VMM Page Faults on XPT
10. VMM Enqueues Page in request for that XPT
11. VMM Notifies virtual machine of Original Page Fault
12. VM is Dispatched (presumably it will task switch or wait)
13. The XPT Page in I/O completes
14. VMM Notifies virtual machine that the original Page Fault is resolved
15. VM is Dispatched
16. VM Page Faults again on the same address
17. VMM Enqueues Page in request for the page faulted on
18. VMM Notifies virtual machine of the Page Fault
19. VM is Dispatched (presumably it will task switch or wait)
20. The Page in I/O completes
21. VMM Notifies virtual machine that the original Page Fault is resolved
22. VM is Dispatched Purge Page Range Notification: There is another way in the system to get a notification of I/O complete from the Virtual Memory Manager. This is on the asynchronous forced write option of the Purge Page SVC. One machine communications interrupt is presented to the virtual machine upon completion of the I/O for the Purge. Like page fault complete interrupts, this is given to the virtual machine, regardless of whether the virtual machine enables page fault notification.

The way it works is an NCB is chained on the page I/O level wait list, along with PBHs. In the NCB is marked the page I/O level that must be achieved before the purge I/O can be considered complete. When that page I/O level is attained, the virtual machine will be notified.

Page Fault Handler: A large function of the page fault handler, namely the way it handles synchronous and asynchronous page faults is discussed in "Page Fault Processing." In the following section, where statements are made such as: "the faulter is notified," this means that if the faulter faulted asynchronously, it is notified, otherwise it is unreadied, as per previously described rules. This section describes the actual process that the page fault handler goes through to resolve a fault.

The page fault handler runs as an extension of the program check handler, at a lower interrupt level; below all interrupting devices. It runs in a backtrack state, thus allowing it to page fault on the Virtual Memory Manager data structures.

When the page fault handler is entered, it immediately saves information about the fault, such as the virtual address. The reason that it does this is, if it page faults within itself, and that fault needs to do I/O, the page fault handler must know what address to give to the virtual machine for asynchronous notification. This implies that no page faults are allowed in the window between where the page fault handler has been backed out because of a page fault and where it is called again to service its own fault.

There are several important steps into which the page fault handler may be broken into:

Page Reclaim

If the page can be reclaimed, then the page fault handler is done. If page in or page out I/O is in progress to the page, then the faulter is chained onto the page's I/O wait list. Upon completion of the I/O, a test is made to see if any process is waiting on the frame and if so, it is notified. Reclaim, therefore, is split across the page fault handler and page fault end.

If the page is on the free list, then the faulter is re-dispatched after the page/frame is made accessible. The faulter is not notified or forced to wait.

Building up the Free Page List

If the free list is found to be below a lower threshold, then page outs are initiated to build it up to an upper threshold. These thresholds are system tuning parameters. If the free list is still empty after attempting to replenish it, then the faulter will be notified of the original fault.

Clock with second chance is the technique used to select pages to be replaced.

Processing the Fault

The page fault handler involves itself with most of the Virtual Memory Manager structures, but most importantly, it examines the XPT for the page faulted on, and the page fault handler may fault at this time. It also allocates a paging space disk slot for the page.

Page Fault End: This procedure handles all I/O completion interrupts for the Virtual Memory Manager. It is scheduled for execution by the queue manager when the hard file device driver dequeues a Virtual Memory Manager request. Note that execution of this routine is delayed until the completion of any preempted Virtual Memory Manager critical section. Page fault cleared notification is given by this procedure according to the rules set in "Page Fault Processing." This procedure may not page fault and, therefore, no references are allowed to XPTs or other pageable data structures.

There are two types of I/O that can complete for the Virtual Memory Manager.

Page in

Page out

All processes waiting on the frame are readied/notified. Also, the page I/O level is updated. This is a count of all the I/O operations that have completed. All processes waiting on a page I/O level less than or equal to the updated page I/O level are readied/notified when the oldest I/O operation completes. The frame is made accessible by validating the IPT tag word for all page in completions and reclaimed page out completions of an unreleased page. Otherwise, the frame is placed on the free list.

This procedure attempts to replenish the system control block area when the number of free system control blocks is below its upper threshold and a free frame exists. All processes waiting on a free system control block are then readied. This procedure is also responsible for waking up processes waiting for a free frame. A free frame is assigned to the process that has been waiting the longest for a free frame. This processes is then notified/readied.

Paging Space: The Virtual Memory Manager supports paging to one or more paging spaces. A requirement of all paging spaces is that they be formatted for 512 byte blocks.

Paging Space Initialization: All paging spaces MUST be known to the Virtual Memory Manager at system initialization. If a user creates a paging space using the Minidisk Manager, then, before the Virtual Memory Manager will page to it, the system must be re-IPLed, or reinitialized. The reason for this is that system initialization is the only time that the Virtual Memory Manager paging space data structures are built. All paging spaces, as well as the disk allocation bit map are set up at Minidisk Manager initialization time. The Minidisk Manager queries all minidisks, and when it finds a paging space minidisk, it calls a routine which effectively "defines" a paging space to the VMM. Before calling the define paging space routine, the Minidisk Manager opens the paging minidisk (it will be left open). The way that the define paging space routine works is as follows:

1. Allocate a PDX for the paging space.
2. Initialize the PDX.
3. Initialize the paging minidisk table.
4. Insert the new PDX onto a linked list of all existing PDXs.
5. Each PDX is made to point to its paging minidisk table entry and vice versa.
6. Set up the disk allocation bit map (temporary disk map) for this paging space.

There is one disk allocation bit map, and it is partitioned among all paging spaces. The reason for having one bit map, rather than multiple, is that by packing paging spaces into one bit map, it will improve the locality of reference to the bit map. The XPTs for the bit map are set such that the bit map is initially all logically zero. If a paging space is not a multiple of 64K, then system initialization rounds the size up to the next 64K boundary, and marks the blocks (bits) in between as allocated. This requires the ability of system initialization to take a first reference page fault at this time.

After defining a paging space, the Minidisk Manager then checks for bad blocks on the paging space. If a bad paging space block is found, the Minidisk Manager will call a routine to mark the bad paging spaces as allocated in the Virtual Memory Manager temporary disk map. This way, the Virtual Memory Manager will never use them. The Minidisk Manager will then do bad block relocation on that paging space in the future.

Paging Space Management: Paging disk blocks are allocated one at a time, in a circular fashion per paging space. A pointer is kept to the last place allocated at in each paging space. On the next allocation in that particular paging space, the search for an empty slot starts at the last allocated slot and incrementally runs through the paging space (wrapping around at end). The idea behind allocating in this fashion is to improve page out affinity, and page ahead. The circular pointer through a paging space can be thought of as pointing to the "oldest" spot on that paging space, or, in other words, the spot that was written out the longest ago. It is a reasonably good probability that that disk slot will be free now (since it was allocated a long time ago). All disk slots are allocated at page out time, so if a large purge page range is performed, causing a lot of slots to be allocated at once, this will allocate them close together. This is assuming that the purge is being done to page out a working set of a particular process, or entity in the virtual machine. When that process becomes active again, its working set is close together on disk, minimizing arm movement, and maximizing page ahead efficiency.

In the presence of more than one paging space, they each, individually, behave as previously described. The Virtual Memory Manager disk allocation will decide which paging minidisk to allocate a block to. The disk scheduler will keep track of where the disk arm is (approximately). The Virtual Memory Manager utilizes this by attempting to allocate on the paging space whose point of last allocation is closest to where the disk arm is (for all disks).

Virtual Memory Manager SVCs: The Virtual Memory Manager SVCs all execute as extensions of the virtual machine. These SVCs can result in explicit I/O such as a page out of a purged page or implicit I/O such as page faults on code, stack, or data. All I/O for synchronous SVCs will place the virtual machine in a synchronous page fault wait state until the I/O is complete. Only implicit I/O for asynchronous SVCs will place the virtual machine in a synchronous page fault wait state until the I/O is complete. Explicit I/O will be initiated and the virtual machine notified upon completion.

Special Program Check Error Processing: Program check errors that occur while executing code within a virtual machine are reported to the virtual machine via a program check virtual interrupt. Program check errors that occur while executing within the VRM result in an abnormal system termination. VRM SVCs execute within the VRM and perform functions on behalf of a virtual machine. Therefore, the program check handler looks at a value in low memory to determine if errors that occur within VRM SVC code are to be reported to the virtual machine as a program check virtual interrupt with the old IAR specifying the SVC or if the errors are an abnormal system termination.

Selected VMM SVCs use this facility to save path length by not checking for error conditions when accessing parameter lists. The program check handler performs the error recovery for them.

Virtual Memory Manager Services: All Virtual Memory Manager services execute synchronously with respect to the caller. Several of these services can result in page faults in which case the process of the caller is forced to wait for the page fault to be resolved.

Asynchronous vs. Synchronous Page Faults: The VRM supports both synchronous and asynchronous page fault processing for virtual machines. With synchronous page fault processing, the entire virtual machine is forced to wait until the page fault is resolved. With asynchronous page fault processing, the virtual machine is allowed to dispatch other tasks. Only the faulting task is forced to wait until the page fault is resolved. Because of this, any operation that results in synchronous page fault processing will tend to lower the number of concurrent tasks that can be executed while any operation that results in asynchronous page fault processing will tend to maximize the number of concurrent tasks that can be executed.

All page faults that occur while processing a VRM service, such as the ones described above, are processed synchronously. Whereas, page faults that occur while executing a virtual machine task are typically processes asynchronously. Therefore, the Virtual Memory Manager eliminates synchronous page faults when it is able to perform an operation on an entry in the XPT of the XPT instead of performing the operation in the corresponding XPT entries. This page fault will occur when a page defined by one of these XPT entries is referenced, though here, the page fault is likely to be processed asynchronously.

Reduced working Set Size: The Virtual Memory Manager avoids touching a page of XPTs when it performs the operation in the XPT of the XPT. This reduces the amount of memory required to contain these data structures during the execution of the service. The size of the working set is reduced by a factor 512 for each operation performed in the XPT of the XPT. For a 256 megabyte segment, this reduces the working set down to a half-page, as opposed to 256 pages.

As described earlier, all activity in a virtual machine is forced to cease during the operation of a VRM service. An operation that referenced 256 pages of pageable data can take longer than 5 seconds. Device overruns can result when a virtual machine is deactivated for such an extended period of time. The Virtual Memory Manager eliminates the likelihood of this happening by taking advantage of the XPT of the XPT to reduce the size of the working set required when performing operations on large segments.

Another disadvantage of a large working set is that it can consume a large portion of real memory. The 256 pages of XPTs required for a 256 megabyte segment are equivalent to half the real page frames in a 1 megabyte system. A Virtual Memory Manager service that touched this many pages would force out of real memory, many pages of data that are currently being used. This would result in excessive page outs during the service and additional page faults after the service completes execution. The Virtual Memory Manager minimizes this effect by reducing the working set for large segments.

Improved Distribution of Page Faults: By not touching all of a segment's XPT entries when it is created, the corresponding page faults are spread out over the life of the segment instead of bunched together during the execution of the Virtual Memory Manager service. This results in a smoother, more predictable system operation. The Virtual Memory Manager does not reference a page's XPT entry until the page is referenced. Therefore, the Virtual Memory Manager will not page in a page's XPT entry until a page is referenced that has an XPT entry in the same page of XPT entries. Furthermore, for sparse segments, one or more of the pages of XPT entries are never referenced and, therefore, never faulted into memory. In this case, a page fault is totally eliminated.

Improved XPT Initialization: The Virtual Memory Manager initializes XPT entries when a segment is destroyed instead of when a segment is created. Each unallocated XPT entry is initialized such that it describes a new, unreferenced page. This is achieved by initializing individual XPT entries for partial pages of XPT entries and initializing the corresponding entry in the XPT of the XPT for complete pages of XPT entries.

As described above, destroy segment must examine each page's XPT entry. Therefore, it can initialize the XPT entry without incurring an additional page fault. Create segment does not need to examine each page's XPT entry. Therefore, it cannot initialize the XPT without incurring an additional page fault. So, by initializing XPT entries at destroy time, the Virtual Memory Manager can reduce the number of page faults on Virtual Memory Manager data structures.

The Virtual Memory Manger can initialize an entire page of XPT entries by initializing the corresponding entry in the XPT of the XPT. In this instance, the Virtual Memory Manager can also free the page frame associated with the page of XPT entries, thus saving an eventual page out of unneeded data.

There are several Virtual Memory Manager services that perform an operation on an entire segment. The first service is the create segment service. A new segment is defined to contain zero as all of its data. The Virtual Memory Manager does not actually initialize each byte in the segment to zero when it creates the segment. Instead, it indicates that the page is unreferenced in the page's XPT entry. The page is initialized to zero by the page fault handler when the page is first referenced.

The second service that may be performed on an entire segment is the destroy segment service. The Virtual Memory Manager releases the resources that are associated with a segment when the segment is destroyed. These resources consist of page frames and paging space. The Virtual Memory Manager must look at each page's XPT entry in order to free the page's paging space.

The third memory manager service that can be performed on an entire segment is called change segment size. The change segment size performs two functions. It can increase or decrease a segment size. When increasing a segment size, this service must allocate a new XPT for the segment and then swap the old and new XPT entries. The decrease segment size function is equivalent to destroying part of the segment.

The fourth memory manager service that can operate on an entire segment is the copy segment function. Pages that have not been referenced, and have been designated as such in the XPT, are not copied by the copy segment service.

It should be understood that the number of instructions required to examine an entry in the XPT can be executed in a relatively short time. However, if a number of these XPT entries need to be modified, then considerable time can be involved in updating or changing entries in the XPT table.

The Virtual Memory Manager supports segments of up to 256 megabytes. As stated previously, the VMM considers any segment that is 1 megabyte or larger to be a large segment. A large segment can be totally filled with data, assuming sufficient disk space. A large segment may also be lightly filled with data that is scattered throughout the segment and, as indicated earlier, this is known as a sparse segment. More precisely, a sparse segment is defined as one with an unreferenced region that totally contains an area defined by one or more pages of XPT entries, i.e., one megabyte.

The External Page Table for a large segment can, itself, be fairly large. An XPT entry defines 2,048 bytes of virtual memory. A page of XPT entries contains 512 of the 4 byte entries and defines 1 megabyte of virtual memory. Therefore, 256 pages of XPT entries are required to define a 256 megabyte segment.

One entry of the XPT defines a page of XPT entries, or 1 megabyte of the virtual memory. External Page Tables for a 256 megabyte segment need only contain 256, 4 byte entries which requires only a half-page of memory. Therefore, the size of the XPT of the XPT required to define a large segment is significantly smaller than the XPT for that segment.

In accordance with the present invention, the Virtual Memory Manager takes advantage of the XPT of the XPT in its support for large, and particularly for large sparse segments. The Virtual Memory Manager performs an operation on 512 pages by examining the appropriate entry in the XPT of the XPT and, thus, examining all 512 XPT entries for the pages. This can reduce the number of instructions executed and eliminate references to pageable portions of the XPT. Otherwise, accessing each entry in the XPT could result in significant overhead due to the number of instructions executed, the number of pages referenced, and the number of page faults resulting from these references. The Virtual Memory Manager takes advantage of the XPT of the XPT in its support for large, and in particularly large sparse segments when operations are performed that are common to the entire segment, as discussed above. For example, during the initialization or creation of a segment, only the XPT of the XPT is initialized for a new segment. This decreases the number of pages that are initialized for a 256 megabyte segment from 256 to 1, thus greatly decreasing the overhead when creating large segments. While the Virtual Memory Manager does not actually initialize each byte in a segment to zero when it creates the segment, it does indicate that the page is unreferenced in the page's XPT entry. This page is initialized to zero by the page fault handler when the page is first referenced. The concept of an unreferenced page was extended to include XPT pages, hence, here the page fault handler initializes a page of XPT entries so that each entry describes an unreferenced or new page. Therefore, the Virtual Memory Manager need not initialize any XPT entries for a 256 megabyte segment. It need only ensure that free pages in the XPT specified as unreferenced in the XPT of the XPT. If the Virtual Memory Manager destroy segment service is called, the Virtual Memory Manager can look at the XPT of the XPT and determine that it can skip 512 pages if the corresponding page of XPT entries has not been referenced. The reason this is possible is that the Virtual Memory Manager references a page's XPT when it assigns paging space or page frames. Therefore, pages with an XPT entry and an unreferenced page of XPT entries cannot have paging space or a page frame associated with it. Similarly, if the Virtual Memory Manager is called upon to change the segment size, a new XPT for the segment must be allocated, and then the information from the old XPT is swapped to the new XPT. The Virtual Memory Manager performs this by exchanging old and new entries in the XPT of the XPT for all complete pages of XPT entries. It then copies pages of old XPT entries into the new XPT, and initializes the old XPT entries to define unreferenced pages. Therefore, the Virtual Memory Manager need only touch at most, two pages of XPT entries when increasing the size of any segment. The decrease segment size function is equivalent to destroying part of the segment, and operates similarly.

The copy segment service of the Virtual Memory Manager, when operating on large segments, can realize the same benefits as destroy segment when copying a large sparse segment. Unreferenced pages need not be copied. Therefore, none of the pages defined by an unreferenced page of XPT entries need be copied since they are also unreferenced.

The ability to use large objects in a virtual memory system is directly related to the performance overhead associated with them. A large performance overhead will decrease the ability of simple applications to use large objects, thereby forcing the design of more complex applications. A small performance overhead, on the other hand, will enhance the ability of simple applications to effectively use large objects. By taking advantage of the XPT of the XPT, the Virtual Memory Manager can significantly reduce the performance overhead associated with large objects. The techniques employed in the improved method help to reduce the number of instructions required to execute an operation, reduce the number of synchronous page faults, reduce the number of pages touched, and thus the working set, reduce the number of page faults, and spread out the cost of large XPTs. The create segment and increase segment size services achieve this for both large segments and large sparse segments. The destroy segment, copy segment, and decrease segment size Virtual Memory Manager services achieve this only with large sparse segments.

The number of instructions required to examine an entry in the XPT of the XPT is approximately the same as the number required to examine one XPT entry. Therefore, the number of instructions required to perform an operation on 512 pages via the XPT of the XPT is roughly 512 times fewer than the number required to perform the same operation on the corresponding 512 XPT entries. Therefore, the Virtual Memory Manager significantly improves the execution time of segment operation whenever it is able to perform an operation in the XPT of the XPT.

Figure 6:
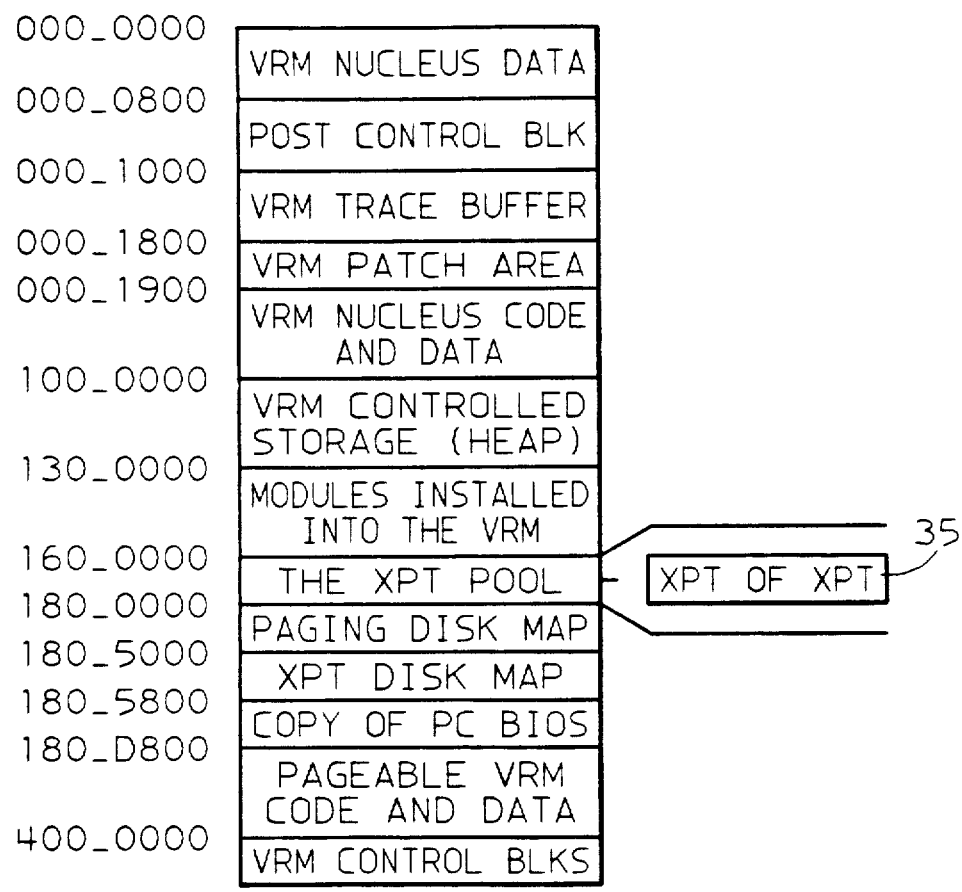
FIG. 6 is a map of the virtual addresses in the segment assigned to the Virtual Resource Manager.

The XPT of the XPT is stored in the segment of memory that is assigned to the VRM. FIG. 6 illustrates the map of virtual addresses for VRM segment zero. The pool of External Page Table entries defined in the VRM segment, as shown in FIG. 6, appears at address 1600000–1800000. The XPT for each defined segment is contained within this pool. The XPT for the VRM segment defines each page in the VRM segment, including the pool of XPT entries which exists between the above-indicated address. The subset 35 of the VRM segment's XPT that defines the pool of XPT entries is referred to as the XPT of the XPT, and is not pageable. In accordance with the present invention, an entry in the XPT of the XPT is modified when one of the above-described Virtual Resource Manager services are to be performed. As indicated, by changing one entry in the XPT of the XPT, a 512 to 1 saving is obtained in system overhead.

Figure 7A:
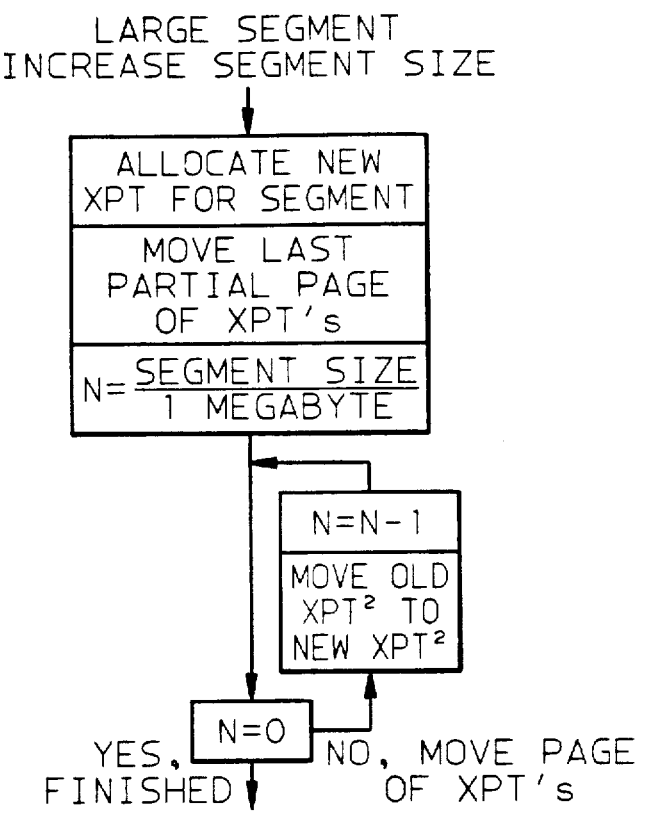
FIGS. 7a and 7b are flow charts illustrating specific steps of the method.
Figure 7B:
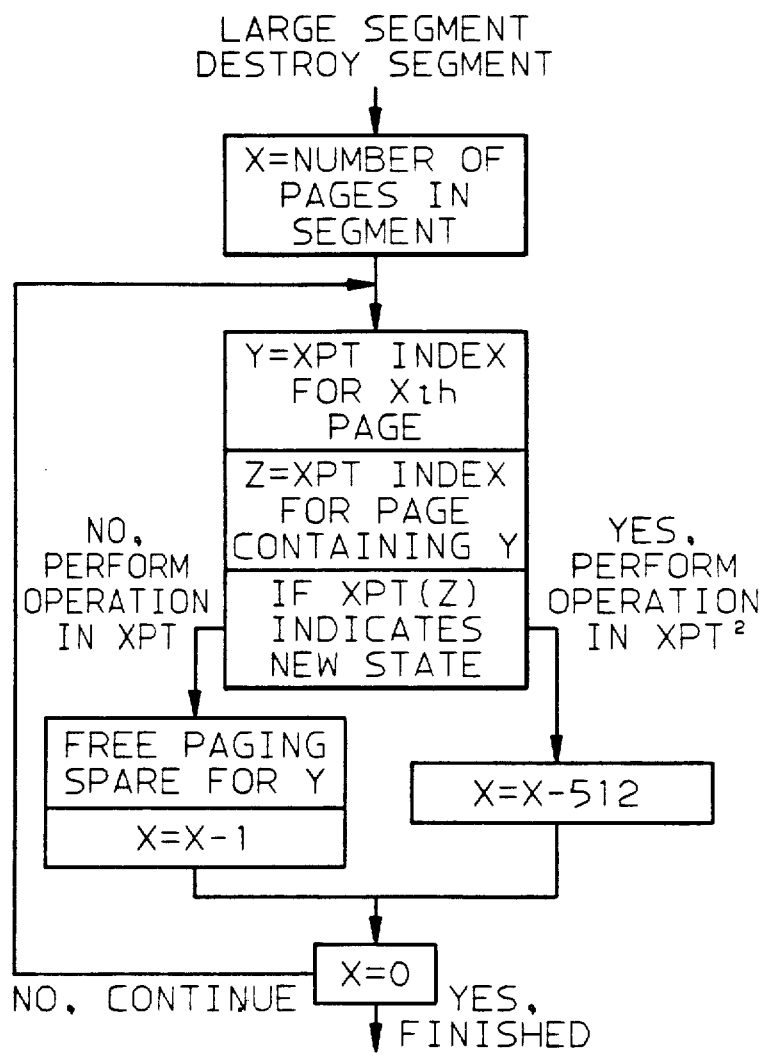

FIGS. 7a and 7b are flow charts illustrating the steps of the improved method for the destroy segment operation and the increase segment size operation. These are merely examples of two of the large segment support operations discussed above.

The increase segment size operation is employed for both regular and sparse large segments. As shown in FIG. 7a, the steps involve allocating a new XPT(s) for the segment from the pool of XPTs established in the system. Next, the last partial page of XPTs of the original segment is moved into, i.e., copied into the newly allocated XPT. A test is made in the third block of the flow chart of FIG. 7a to determine if the new segment was or is now a "large" segment, i.e., over 1 megabyte. This step, in effect, determines how many XPT²s (the XPT of the XPT) are needed for the new segment. If the segment is not a large segment, the operation is concluded. If it is a large segment, that is, "n" is not equal to 0, then at least one page of XPT entries exists which can be copied as a new page of XPTs for the new segment. The number of XPT²s (a page of XPTs), is decremented by one in the succeeding block and the process repeats until all of the pages of XPT entries have been copied for the new segment.

The destroy segment operation is shown in FIG. 7b. This operation releases resources that are associated with the segment, including page frames in real memory and paging space on the disk or secondary storage. The XPT contains data that defines pages' paging space. By looking at the one entry in the XPT², one page of XPT entries may be skipped if they have never been referenced (used) by the system. This condition occurs quite often in a large sparse segment. In FIG. 7b, the first three blocks function to locate an entry in the XPT² data structure which indicates that one page of XPT entries have not been referenced. This is indicated by one entry in the XPT² having a "new" page status. This one entry is then changed to release all of the 512 pages represented by that one entry in the non-pageable data structure and the number of pages "x" in the segment is decreased by 512. A check is made if the number of pages is 0, and if not, the process is repeated. When an entry in the XPT² non-pageable data structure cannot be changed, the operation proceeds following the left-hand path in FIG. 7b to operate on one page entry in the XPT. The total number of pages is reduced by one, and if unreleased pages still exist in the segment, the process is repeated until all pages are released.

While the invention has been particularly shown and described with reference to a preferred embodiment, it should be understood by those persons skilled in the art that various changes and modifications may be made without departing from the spirit and scope of the invention.

We claim:

1. A method used in a data processing system having a virtual memory for performing selected operations on entire large segments including a "create segment" operation, each said segment that is created having a unique address range and a plurality of virtual pages each having a virtual address within said unique address range, each said virtual page having a plurality of different states including a first state where said page is free and unreferenced and a second state where said page is committed, said committed virtual pages being demand paged into said system and stored at a physical location having a real address of a first storage device and paged into another storage location of a second storage device by a page faulting mechanism when required by said system, said system further including a plurality of pageable external page tables (XPTs), each XPT having at least one page of XPT entries, each said page of XPT entries having a virtual address and including k entries, each having n bytes, where k times n is equal to the byte capacity of a virtual page in said system, each said XPT entry having a first field for storing said real address of one of said virtual pages and a second field for storing an indication of said state of said one said virtual page, said "create segment" operation comprising the combination of the following steps, (A) establishing one virtual segment having pages with virtual page addresses that correspond to real page addresses, (B) storing said one virtual segment in said second storage device so that said one virtual segment in not pageable, (C) providing a non-pageable data structure XPT² having k' entries, each having n' bytes where k' times n' equals said byte capacity, each of said k' XPT² entries having a first field for storing the virtual address of one said page of XPT entries and a second field for storing an indication that all of said pages represented by said XPT entries in said one page of XPT entries are either in said first state or said second state, (D) establishing a sub-set of real addresses for said one virtual segment for storing a plurality of said XPT² data structures, and (E) changing said indication from said first state to said second state in at least one of said k' XPT² entries corresponding to said address range of said newly created segment whereby a new segment is created having at least k virtual pages by changing only one said indication in one XPT² entry for each said k pages created.

2. The method recited in claim 1 further including the step of issuing a request by said system for a new segment to be created, and said step of changing an entry in said non-pageable data structure is in response to said step of issuing a request for said segment to be created in which the number of pages in said segment exceeds x/n, where "x" equals the byte capacity of each virtual page.

3. The method recited in claim 2 in which said n byte entry and said n' byte entry each comprise 4 bytes.

4. The method recited in claim 3 in which each page of XPT entries includes 512 entries corresponding to 512 virtual pages and each virtual page is capable of storing 2048 bytes of data.

5. The method recited in claim 2, further including the step of,
   (A) determining the number of new pages that are to be included in the new segment that the system has requested be created, then,
   (B) deciding to perform either said step of changing said entry in said non-pageable data structure XPT² when said step of determining indicates that the number of new pages is greater than the number of entries in one page of XPT entries or,
   (C) modifying the individual said entries in the XPT corresponding to the virtual pages of the new segment when said number of new pages is less than the number of entries in a page of XPT entries.

6. The method recited in claim 5, further including the step of allocating in said second storage device one said real address for each XPT² entry which corresponds to each group of x/n or less XPT entries.

7. The method recited in claim 2, further including the step of subsequently increasing the number of virtual pages in the said segment after it has been created, including the steps of,
   (1) allocating another real address in said second storage device for a second non-pageable data structure XPT²;
   (2) copying entries from the old XPT² which have been modified since being created to said second XPT², and
   (3) copying old XPT entries into a new XPT.

8. The method recited in claim 7, further including the step of modifying said old XPT entries subsequent to said copying step to define the states of each page as being free and unreferenced.

9. The method recited in claim 2, further including the step of performing a different said large segment operation which includes the further steps of,
   (A) inspecting said entries of said XPT² to determine if at least one entry indicates at least x/n contiguous non-referenced pages which are still in said first state, said step of performing a different said operation being characterized by not performing said different said operation on any of said virtual pages that said step of inspecting indicated were virtual pages in said first state.

10. The method recited in claim 2, further including the step of subsequently destroying said created segment of virtual memory by releasing virtual pages which are not in said first state including the step of inspecting each XPT² entry corresponding to said segment to be destroyed to determine the status of the corresponding virtual pages, prior to performing an operation that releases said page, said method further including the steps of,
   (1) performing a release operation on each virtual page represented by an XPT entry on the page of XPT entries that corresponds to said XPT² entry if said step of inspecting said XPT² entry indicates that all pages are not in said first state and,
   (2) eliminating said step required to release a virtual page whenever said step of inspecting said XPT² entry indicates all pages are in said first state.

* * * * *

UNITED STATES PATENT AND TRADEMARK OFFICE
CERTIFICATE OF CORRECTION

PATENT NO.  : 4,730,249

DATED       : March 8, 1988

INVENTOR(S) : John T. O'Quin, II et al.

It is certified that error appears in the above-identified patent and that said Letters Patent is hereby corrected as shown below:

On the Title Page, Item [75] Inventors:

-- Mark D. Rogers, Austin, Tx. -- should be added.

Signed and Sealed this

Sixteenth Day of May, 1989

Attest:

DONALD J. QUIGG

Attesting Officer

Commissioner of Patents and Trademarks